United States Patent
Bae

(10) Patent No.: US 6,894,737 B2
(45) Date of Patent: May 17, 2005

(54) LIQUID CRYSTAL DISPLAY DEVICE HAVING IMPROVED SEAL PATTERN AND METHOD OF FABRICATING THE SAME

(75) Inventor: Sung-Sik Bae, Kyoungsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 430 days.

(21) Appl. No.: 09/859,681

(22) Filed: Sep. 24, 2001

(65) Prior Publication Data

US 2002/0030769 A1 Mar. 14, 2002

(30) Foreign Application Priority Data

May 18, 2000 (KR) ......................................... 2000-26786

(51) Int. Cl.$^7$ ............................................. G02F 1/136
(52) U.S. Cl. ........................ 349/43; 349/42; 349/44; 349/110; 349/138; 349/39
(58) Field of Search .......................... 349/42, 44, 110, 349/138, 39, 43, 40

(56) References Cited

U.S. PATENT DOCUMENTS

| | | | | |
|---|---|---|---|---|
| 5,238,435 A | * | 8/1993 | TeVelde | ....................... 445/24 |
| 5,485,055 A | * | 1/1996 | Keyser | ........................ 313/505 |
| 5,641,974 A | | 6/1997 | den Boer et al. | |
| 5,780,871 A | | 7/1998 | den Boer et al. | |
| 5,920,084 A | | 7/1999 | Gu et al. | |
| 5,955,744 A | | 9/1999 | Gu et al. | |
| 5,994,721 A | | 11/1999 | Zhong et al. | |
| 6,057,896 A | * | 5/2000 | Rho et al. | ....................... 349/42 |
| 6,137,559 A | * | 10/2000 | Tanaka et al. | ............... 349/153 |
| 6,195,140 B1 | * | 2/2001 | Kubo et al. | .................... 349/44 |
| 6,330,047 B1 | * | 12/2001 | Kubo et al. | .................. 349/147 |
| 6,332,569 B1 | * | 12/2001 | Cordes et al. | ............... 228/254 |

FOREIGN PATENT DOCUMENTS

GB 2315245 * 1/1998 ......... H01L/21/311

* cited by examiner

Primary Examiner—Nathan J. Flynn
Assistant Examiner—Fazli Erdem
(74) Attorney, Agent, or Firm—Morgan Lewis & Bockius LLP

(57) ABSTRACT

A liquid crystal display having a substrate includes a plurality of gate lines extended from each gate on the substrate, a gate insulating layer on the substrate including the gate lines, a plurality of data lines arranged to be perpendicular to the gate lines, a passivation layer over the data lines and the gate insulation layer, a plurality of etching holes in the passivation layer and the gate insulating layer, wherein the gate insulating layer within the etching holes has at least one concave and convex portions, and a plurality of seal pattern lines in the etching holes.

28 Claims, 8 Drawing Sheets

LIQUID CRYSTAL DISPLAY DEVICE HAVING IMPROVED SEAL PATTERN AND METHOD OF FABRICATING THE SAME

This application claims the benefit of Korean Application No. 2000-26786 filed May 18, 2000, which is hereby incorporated by reference.

BACKGROUND OF THE INVENTION

1. Field of the Invention

The present invention relates to a liquid crystal display device, and more particularly, to a liquid crystal display device having an improved seal pattern and method of fabricating the same. Although the present invention is suitable for a wide scope of applications, it is particularly suitable for enhancing adhesion between a sealant and an array substrate, thereby providing high yield.

2. Discussion of the Related Art

Liquid crystal display (LCD) devices having light, thin, low power consumption characteristics have been widely used in office automation (OA) equipment and video units. A typical liquid crystal display (LCD) panel has upper and lower substrates and an interposed liquid crystal layer. The upper substrate, referred to as a color filter substrate, usually includes common electrodes and color filters. The lower substrate, referred to as an array substrate, includes switching elements, such as thin film transistors (TFTs), and pixel electrodes.

A brief explanation of a conventional liquid crystal display manufacturing process will be discussed for better understanding of the present invention.

Common electrodes and pixel electrodes are formed on upper and lower substrates, respectively. A seal is then formed on the lower substrate. The upper and lower substrates are then bonded together using the seal such that the common electrodes of the upper substrate and the pixel electrodes of the lower substrate face each other, forming liquid crystal cells.

Liquid crystal material is then injected into those cells through injection holes. The injection holes are then sealed. Finally, polarizing films are attached to the outer surfaces of the upper and lower substrates.

The pixel and common electrodes generate electric fields that control the light passing through the liquid crystal cells. By controlling the electric fields, desired characters or images are displayed.

FIG. 1 is the configuration of a typical TFT-LCD device. The TFT-LCD device 11 includes upper and lower substrates 5 and 22 with an interposed liquid crystal 14. The upper and lower substrates 5 and 22 are referred to as a color filter substrate and an array substrate, respectively.

In the upper substrate 5, on the surface opposing the lower substrate 22, a black matrix 6 and a color filter layer 7 that includes a plurality of red (R), green (G), and blue (B) color filters are formed in the shape of an array matrix. Each color filter 7 is thus surrounded by the black matrix 6. Further on the upper substrate 5, a common electrode 18 is formed and covers the color filter layer 7 and the black matrix 6.

In the lower substrate 22, on the surface opposing the upper substrate 5, a thin film transistor (TFT) "T", as a switching device, is formed in the shape of an array matrix corresponding to the color filter layer 7. A plurality of crossing gate and data lines 13 and 15 are positioned such that each TFT "T" is located near each crossing point of the gate and data lines 13 and 15.

Further in the lower substrate 22, a plurality of pixel electrodes 17 are formed on the area defined by the gate and data lines 13 and 15. The defined area is called a pixel region "P". The pixel electrode 17 is usually formed of a transparent conductive material having good transmissivity such as indium-tin-oxide (ITO) or indium-zinc-oxide (IZO).

Although fabricating various components of a liquid crystal display, such as a thin film transistor or a color filter, typically requires numerous process steps, the overall fabrication process is relatively straightforward.

FIG. 2 illustrates a manufacturing process for the typical liquid crystal display panel. Step st1 forms an array matrix of thin film transistors and pixel electrodes over an array (lower) substrate. In this initial step (st1), each pixel electrode corresponds to each thin film transistor.

Step st2 forms an orientation film over the lower (array) substrate and the upper (color filter) substrate. This process involves uniformly depositing a polymer thin film over the lower substrate and then uniformly rubbing the polymer thin film with a fabric. The rubbing process involves rubbing the surface of the polymer thin film to orientate or align the film. This rubbing process is so important as to determine an orientation direction of the liquid crystal layer. Also, owing to this rubbing process, the liquid crystal layer is properly driven and a uniform display characteristic can be achieved. A typical orientation film is an organic thin film such as a polyimide thin film.

Step st3 produces a seal pattern on the lower substrate. When the upper and lower substrates are attached, the seal pattern forms cell spaces that will receive the liquid crystal material. The seal pattern will also prevent the interposed liquid crystal material from leaking out of the completed liquid crystal cell. A thermosetting plastic and a screen-print technology are conventionally used to fabricate the seal pattern.

Step st4 is to spray spacers over the lower substrate. The spacers have a definite size and act to maintain a precise and uniform space between the upper and lower substrates. Accordingly, the spacers are placed with a uniform density on the lower substrate using either a wet spray method, in which case the spacers are mixed in an alcohol and then sprayed, or a dry spray method in which only the spacers are sprayed. The dry spray method is divided into a static electric spray method that uses static electricity and a non-electric spray method that uses gas pressure. Since static electricity can be harmful to the liquid crystal, the non-electric spray method is more widely used than the electric spray method.

The next step, st5, is to align and attach the upper and lower substrates together. An aligning margin, which is less than a few micrometers, is important in this step. If the upper and lower substrates are aligned and attached beyond the aligning margin, light may leak from the panel such that the liquid crystal cell cannot adequately performed its function. As a result, resolution characteristics of the LCD device are deteriorated.

Step st6 cuts liquid crystal elements fabricated through the above five steps into individual liquid crystal cells. Conventionally, a liquid crystal material was injected into the space between the upper and the lower substrates before cutting the liquid crystal element into individual liquid crystal cells. However, as the display devices have become larger, the liquid crystal cells are usually cut first and then the liquid crystal material is injected. The cutting process typically includes scribing using a diamond pen to form cutting lines on a substrate, and a breaking step that separates the substrate along the scribed lines.

Step st7 actually injects a liquid crystal material into the individual liquid crystal cells. Since each individual liquid crystal cell is a few square centimeters in area, but has only a few micrometers gap between plates, a vacuum injection method is widely used since it is more efficient. Generally, the step of injecting the liquid crystal material into the cells takes the longest process time in manufacturing. Thus, for manufacturing efficiency, it is important to use optimum conditions for a vacuum injection.

Now, referring to FIG. 3, the screen print method used for the seal pattern process of the third step (st3) of FIG. 2 is explained.

A screen print technology is facilitated with a patterned screen 6 and a squeegee 8. In order to interpose the liquid crystal without leakage, the seal pattern 2 is formed along the edges of a substrate 22. At one side of the edge, an injection hole 4 for injecting the liquid crystal is formed. To form the seal pattern 2, a thermosetting resin or an ultraviolet-setting epoxy resin and the like is deposited on the substrate 22. Thereafter, a solvent included in the sealant is evaporated for leveling.

At this point, although the epoxy resin itself may not harmful to the liquid crystal, an amine in a thermo-hardening solvent for forming the thermosetting resin decomposes the liquid crystal. Thus, when using the epoxy resin for the seal pattern 2, the sealant formed through the screen-print technology should be pre-baked sufficiently with a gradual variance of the baking temperature. Further, in forming the seal pattern, uniformity in thickness and width of the sealant are very important to maintain a uniform spacing (or gap) between the two substrates.

FIG. 4 shows a conventional seal pattern formed on a substrate via the above-mentioned seal-patterning technology, such as a screen-print method. Referring to FIG. 4, a seal pattern 2 is formed on a substrate 22. The seal pattern 2 includes main seal lines 2a and auxiliary seal lines 2b. As previously explained, the main seal lines 2a prevent a leakage of the liquid crystal while the auxiliary seal lines 2b surround the main seal lines 2a to protect the main seal lines 2a from a cleaning solution or an etching solution during cleaning and etching processes.

FIG. 5A, a cross-sectional view taken along the line V—V of FIG. 4, illustrates one pixel of the liquid crystal panel and the seal patterns formed between the upper and lower substrates. Now, referring to FIG. 5A, a fabrication process of the array substrate 23 is explained in detail hereinafter.

In general, when forming-the array substrate 23, the fabrication process varies with a type of the thin film transistor "T". For convenience, an inverted staggered type thin film transistor (TFT) is employed as a switching element of the liquid crystal panel for a description of the background technology. Thus, a process of forming the inverted staggered type TFT will be explained.

First, a plurality of gate lines (reference numeral 13 of FIG. 1) and a gate electrode 32 extended from each gate line are formed on the lower substrate 22 by depositing and patterning a first metallic material, such as aluminum (Al), chrome (Cr), molybdenum (Mo) or etc. After that, a gate insulation layer 33 is formed on the substrate 22 to cover the gate lines and electrodes by depositing an inorganic material such as silicon oxide ($SiO_2$) or silicon nitride ($SiN_x$).

By depositing and patterning a semiconductor layer on the gate insulation layer 33, an active layer 36 having an island shape is formed over each gate electrode 32. On the active layer 36, source and drain electrodes 39 and 41 overlap both ends of the gate electrode 32 and are spaced apart from each other. The source and drain electrodes 39 and 41 are formed of the same material as the first metallic material and formed by the depositing and pattering processes. Moreover, a plurality of data lines (reference numeral 15 of FIG. 1) perpendicular to each gate line are formed with the source and drain electrodes 39 and 41. Each source electrode 39 is extended from each data line.

The thin film transistor "T" is located near the crossing point of the gate and data lines. Also, each pair of the data and gate lines defines a pixel area.

Next, an organic material such as benzocyclobutene (BCB) or acryl is deposited over the thin film transistor T and the gate insulation layer 33 in order to form a passivation layer 35. Then, the passivation layer 35 is patterned to form a drain contact hole 34 that exposes a portion of the drain electrode 41. Thereafter, a pixel electrode 38 is formed on the passivation layer 35 by depositing and patterning a transparent conductive material. Thus, the drain electrode 41 is electrically connected with the pixel electrode 38 through the drain contact hole 34.

After forming the array substrate 23 that includes the lower substrate 22, the gate insulation layer 33, the passivation layer 35, the TFT and etc, the upper substrate 5 having the common electrode 18 is aligned and attached to the array substrate 23 using the sealant 2 (i.e., the seal pattern). As the sealant 2 is mainly used for attaching the upper substrate 5 to the array substrate 23, the sealant 2 is positioned between the common electrode 18 and the passivation layer (organic material) 35, as shown in FIG. 5.

The passivation layer 35 and the gate insulation layer 33, which are respectively formed of the organic material and the inorganic material, have an etching hole (not shown in FIG. 5) in a seal pattern area having a width. Since the sealant 2 does not have good adhesive force to the organic material (the passivation layer 35), the sealant 2 often bursts. Because of this problem, the etching hole is formed in the array substrate 23.

In the seal pattern area, the passivation layer 35 is mostly etched out, and thus, the sealant 2 may contact the inorganic material (the gate insulation layer 33). Thus, the sealant 2 does not largely contact the organic material (the passivation layer 35) that has a lower adhesive force to the sealant 2. Moreover, owing to the etching hole, the contacting area increases between the sealant 2 and the array substrate 23.

However, the above-mentioned structure does not provide a required adhesion, and also it does not sufficiently enlarge the seal pattern area that is the contacting area between the seal pattern 2 and the array substrate 23. Accordingly, it is essential to obtain the large seal pattern area and to increase the contacting area in the liquid crystal panel. Moreover, to obtain a large contacting area, enlarging the width of the seal pattern 2 is not good enough because of an aperture ratio. As a result, it reaches the limit to enlarge the width.

SUMMARY OF THE INVENTION

Accordingly, the present invention is directed to a liquid crystal display device having an improved seal pattern and method of fabricating the same that substantially obviate one or more of problems due to limitations and disadvantages of the related art.

An object of the present invention is to provide a liquid crystal display device having an improved seal pattern and method of fabricating the same that increase an adhesive force between a seal pattern and an array substrate while maintaining a width of the seal pattern.

Additional features and advantages of the invention will be set forth in the description, which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display having a substrate includes a plurality of gate lines extended from each gate on the substrate, a gate insulating layer on the substrate including the gate lines, a plurality of data lines arranged to be perpendicular to the gate lines, a passivation layer over the data lines and the gate insulation layer, a plurality of etching holes in the passivation layer and the gate insulating layer, wherein the gate insulating layer within the etching holes has at least one concave and convex portions, and a plurality of seal pattern lines in the etching holes.

In another aspect of the present invention, a liquid crystal display having a substrate includes a plurality of gate lines extended from each gate on the substrate, a gate insulating layer on the substrate including the gate lines, a plurality of data lines arranged to be perpendicular to the gate lines, a passivation layer over the data lines and the gate insulation layer, a plurality of etching holes in the passivation layer and the gate insulating layer, wherein the gate insulating layer within the etching holes has at least one concave and convex portions and the passivation layer within the etching holes substantially matches the convex portion of the gate insulating layer, a plurality of seal pattern lines in the etching holes, and an adhesion enhancing metal line between the substrate and the seal pattern lines.

In another aspect of the present invention, a method of fabricating a liquid crystal display having a substrate includes the steps of forming a plurality of gate lines extended from each gate on the substrate, forming a gate insulating layer on the substrate including the gate lines, forming a plurality of data lines arranged to be perpendicular to the gate lines, forming a passivation layer over the data lines and the gate insulation layer, forming a plurality of etching holes in the passivation layer and the gate insulating layer, wherein the gate insulating layer within the etching holes has at least one concave and convex portions; and forming a plurality of seal pattern lines in the etching holes.

In another aspect of the present invention, a method of fabricating a liquid crystal display having a substrate, the method comprising the steps of forming a plurality of gate lines extended from each gate on the substrate, forming a gate insulating layer on the substrate including the gate lines, forming a plurality of data lines arranged to be perpendicular to the gate lines, forming a passivation layer over the data lines and the gate insulation layer, forming a plurality of etching holes in the passivation layer and the gate insulating layer, wherein the gate insulating layer within the etching holes has at least one concave and convex portions and the passivation layer within the etching holes substantially matches the convex portion of the gate insulating layer, forming a plurality of seal pattern lines in the etching holes, and forming an adhesion enhancing metal line between the substrate and the seal pattern lines.

In another aspect of the present invention, an array substrate for a liquid crystal display device includes a plurality of gate lines arranged in a transverse direction on a substrate, a plurality of data lines arranged in a longitudinal direction perpendicular to each gate line, a plurality of switching elements, each switching element includes a gate electrode extended from the gate line, a source electrode extended from the data line, a drain electrode space apart from the source electrode, a gate insulation layer on the gate electrode, and an active layer interposed between the gate insulation layer and the source and drain electrodes, a passivation layer over the switching elements and on the gate insulation layer, the passivation layer having a drain contact hole to the drain electrode, a pixel electrode corresponding to each switching element, the pixel electrode contacting the drain electrode through the drain contact hole, and a plurality of seal pattern lines that are arranged along edges of the passivation layer, wherein each seal pattern line is disposed in a seal pattern area that has a width over the substrate, wherein the seal pattern area is defined along the edges of the passivation layer, and wherein the seal pattern area has a plurality of internal indentations and external projection.

In a further aspect of the present invention, a method of forming a seal pattern for a liquid crystal display device includes the steps of forming a plurality of gate lines in a transverse direction on a substrate, forming a plurality of gate electrodes, each gate electrodes extended from each gate line, forming a gate insulation layer on the substrate to cover the gate lines and the gate electrodes, forming an active layer on the gate insulation layer and over each gate electrode, forming a plurality of data lines on the gate insulation layer, each data lines is perpendicular to the gate lines, forming source and drain electrodes on the active layer and over each gate electrode, source and drain electrodes spaced apart from each other, forming a passivation layer on the gate insulation layer to cover the data lines and the source and drain electrodes, defining a seal pattern area on a surface of the passivation layer and along edges of the passivation layer, the seal pattern area having a width, and etching portions of the passivation and gate insulation layers which correspond to the seal pattern area to form a plurality of internal indentation and external projection.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings:

FIG. 5A is an enlarged cross-sectional view of a portion "F" of FIG. 5B;

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
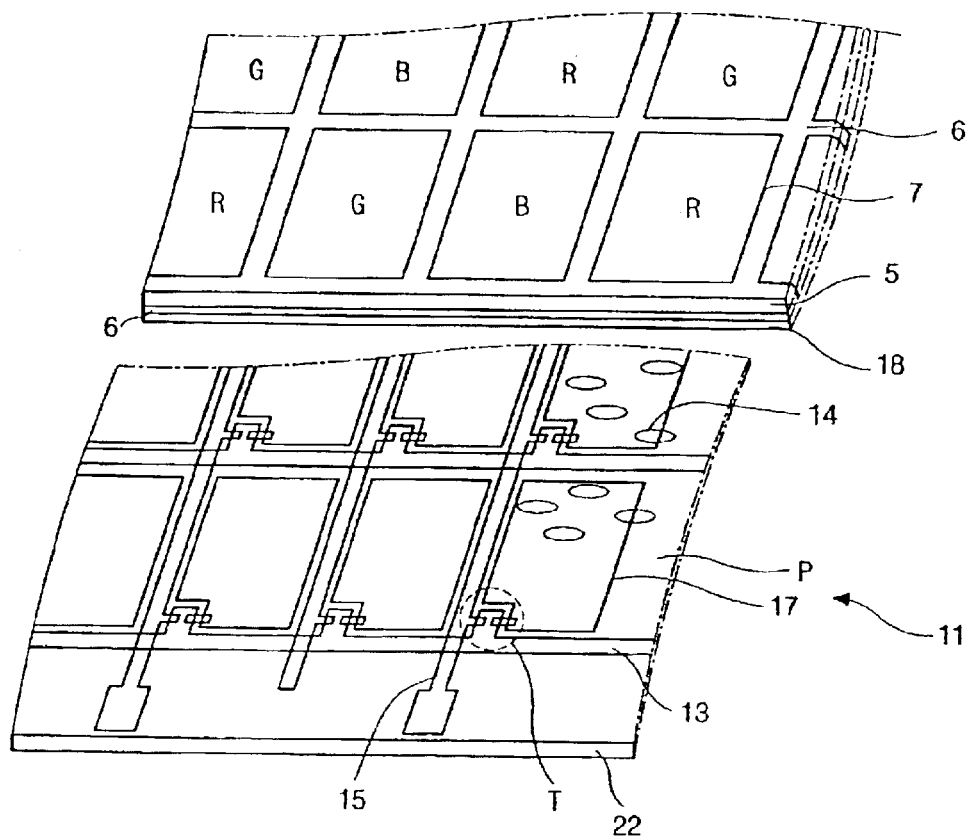
FIG. 1 is a schematic view illustrating a configuration of a typical thin film transistor liquid crystal display device.
Figure 2:
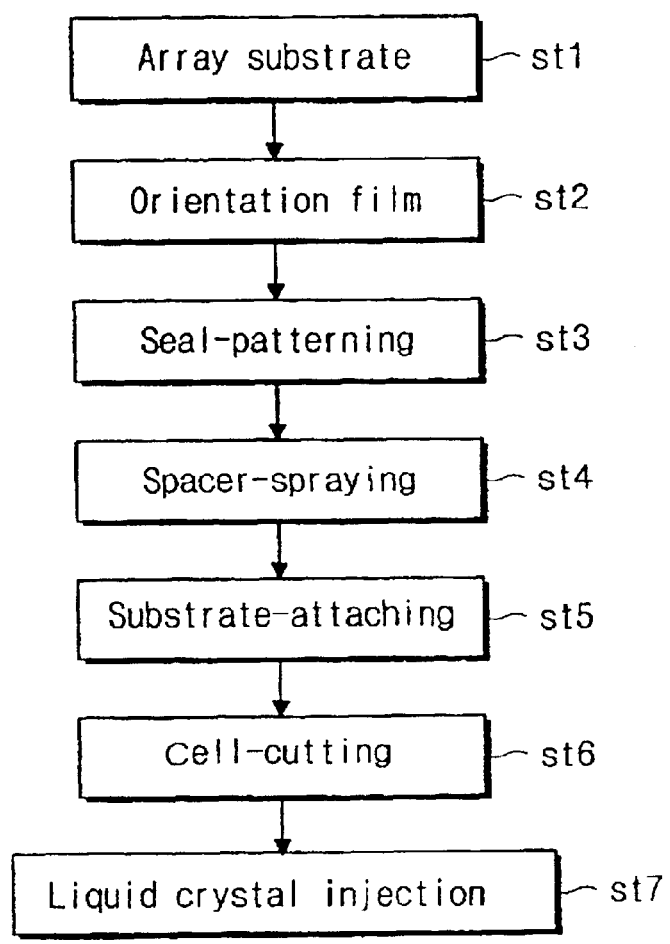
FIG. 2 is a block diagram illustrating a typical manufacturing process for a liquid crystal cell.
Figure 3:
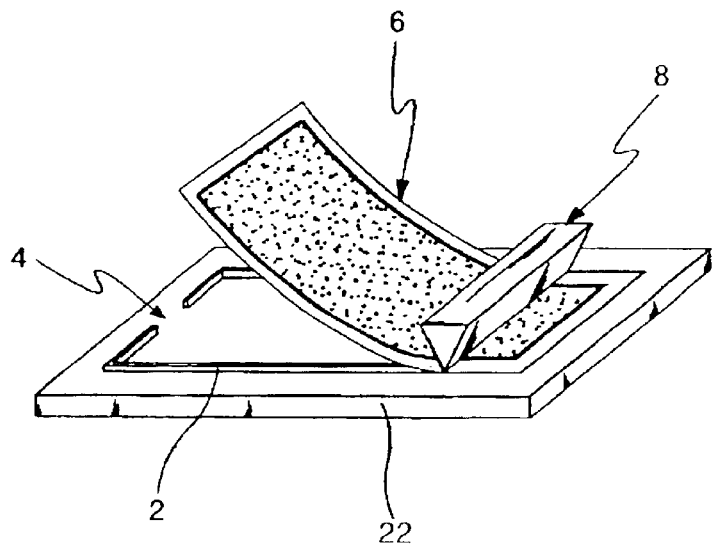
FIG. 3 is a perspective view illustrating a seal pattern fabricating process with a screen-print method.
Figure 4:
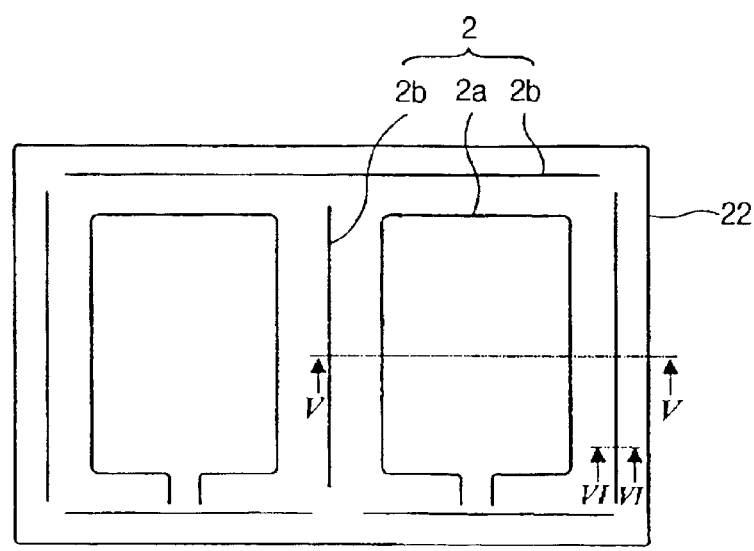
FIG. 4 is a plane view of a conventional seal pattern printed on a substrate.
Figure 6A:
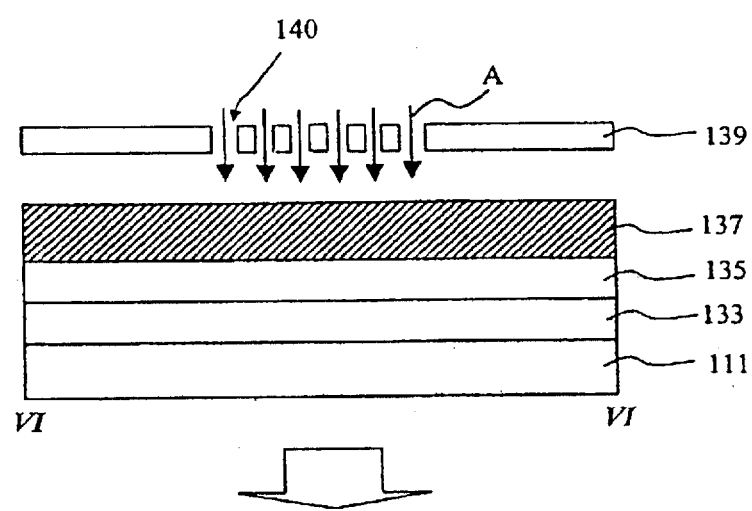
FIGS. 6A to 6C are cross sectional views taken along the line VI—VI of FIG. 4 illustrating fabricating processes for a seal pattern according to a first embodiment of the present invention.
Figure 6A:
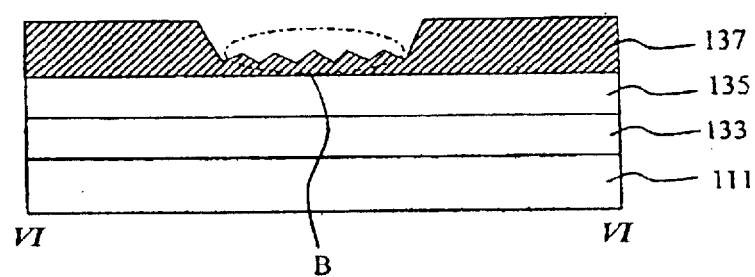
Figure 6B:
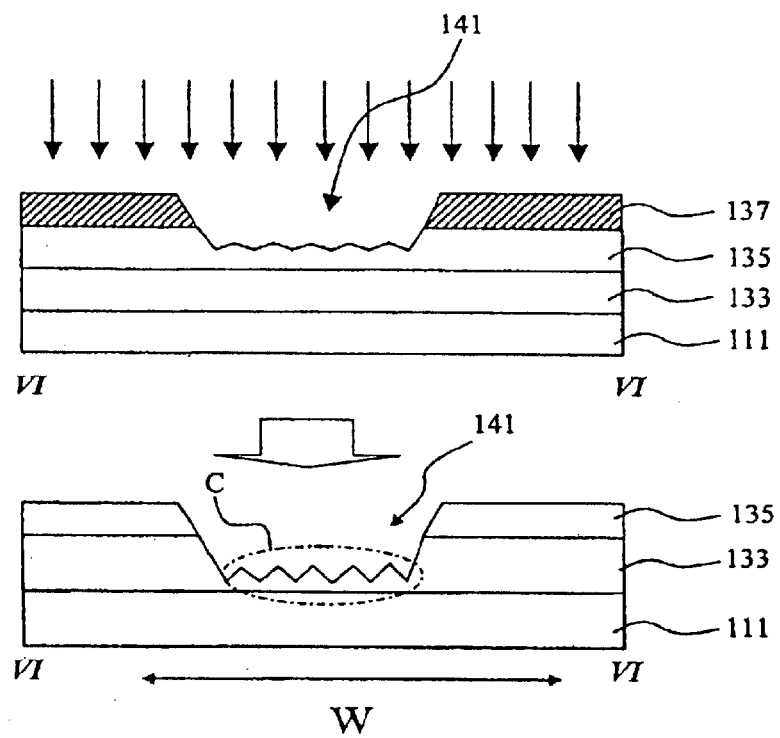
Figure 6C:
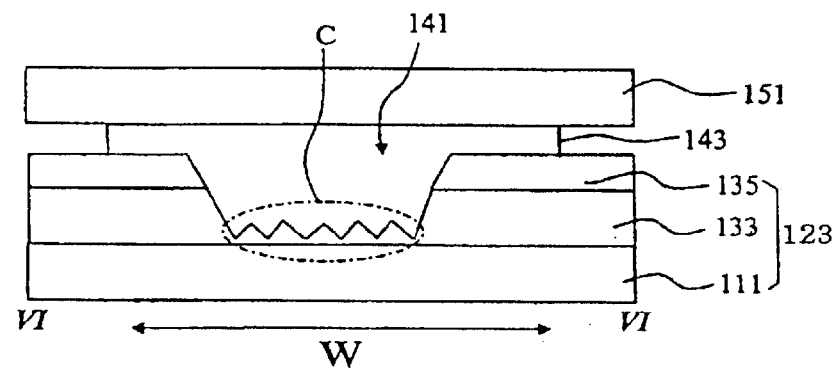

FIGS. 6A to 6C are cross-sectional views taken along the line VI—VI of FIG. 4 illustrating fabricating processes for a seal pattern according to a first embodiment of the present invention.

FIG. 6A illustrates a photoresist process for forming an etching hole in a seal pattern area of an array substrate. As shown in the drawing, a gate insulation layer 133 and a passivation layer 135 are stacked on a substrate 111. Here, the gate insulation layer 133 is formed of an inorganic material while the passivation layer 135 is made of an organic material. The seal pattern area for a seal pattern is determined in the edges of the stacked structure of the array substrate. In order to form an etching hole, a photoresist layer 137 is formed on the entire surface of the passivation layer 135. A light exposure process is then performed using a mask 139.

In this process, the mask 139 has a plurality of slits 140 corresponding to the seal pattern area such that the light "A" passing the slits 140 is diffracted. Thus, the incident light "A" irregularly exposes the seal pattern area of the photoresist layer 137 due to light diffraction. More specifically, the light "A" passing the slits 140 interferes with each other and produces bright and dark bands in the seal pattern area of the photoresist layer 137. Due to an interference, the bright bands exposure the photoresist layer 137 deeper than the dark bands.

Therefore, when the photoresist layer 137 is removed using a stripping solution for a predetermined time, the photoresist layer 137 in the seal pattern area is unevenly etched out. Thus, the uneven bottom portion "B" is formed. Accordingly, the surface of the photoresist layer 137 has unevenness "B" in the seal pattern area due to a difference in an exposed amount to the light.

FIG. 6B illustrates an etching process for forming an etching hole 141. In this etching process, the photoresist layer 137, the passivation layer 135, and the gate insulation layer 133 are sequentially etched using a dry-etching method. When dry etching is processed, an etching ratio of the surface of the photoresist layer 137 is the same at the even the regions. Thus, the unevenness "C" is maintained after removing the photoresist layer 137.

In other words, while eliminating the photoresist layer 137, the etching hole 141 becomes deeper, a portion of the passivation layer 135 is completely removed in the seal pattern area. Moreover, a portion of the gate insulation layer 133 is almost removed in the seal pattern area. Finally, the etching hole 141 is formed and unevenness "C" is formed in the seal pattern area.

However, when the etching hole 141 is formed therein, the etching hole 141 is not formed in all seal pattern areas that are disposed transversely and longitudinally, as shown in FIG. 4. A plurality of etching holes 141 are sparsely formed in the determined portions of the seal pattern area except for the portions for a plurality of gate and data lines. Moreover, a width of the etching hole 141 is equal to or less than the width "W" of the seal pattern.

Further, this etching process described above is simultaneously performed with forming the drain contact hole to the drain electrode.

Now, referring to FIG. 6C, a sealant 143 (i.e., a seal pattern) is formed into the etching hole and in the seal pattern area having the width "W" using a screen-print method. During performing the screen-print method, the sealant 143 fulfills the etching hole 141 and contacts the uneven bottom "C" of the etching hole 141. After that, the upper substrate 151 is aligned and attached to the array substrate 123.

As described above, the etching hole has the uneven bottom, and the portion of the organic material (i.e., the passivation layer 135) is removed in the seal pattern area. Thus, the sealant formed in the seal pattern area contacts not only the organic material but also the inorganic material (i.e., the gate insulation layer 133). Moreover, due to the uneven bottom of the etching hole, the contacting area between the sealant and the array substrate is enlarged. As a result, an adhesive force is increased between the sealant and the array substrate.

Figure 7A:
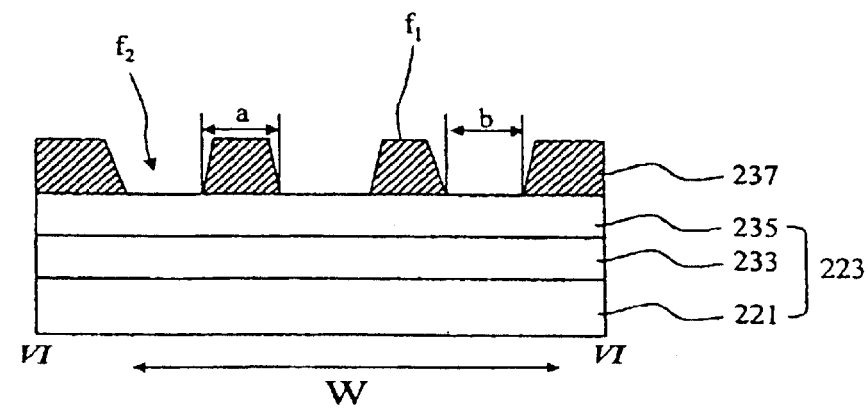
FIGS. 7A to 7C are cross sectional views taken along the line VI—VI of FIG. 4 illustrating fabricating processes for a seal pattern according to a second embodiment of the present invention.
Figure 7B:
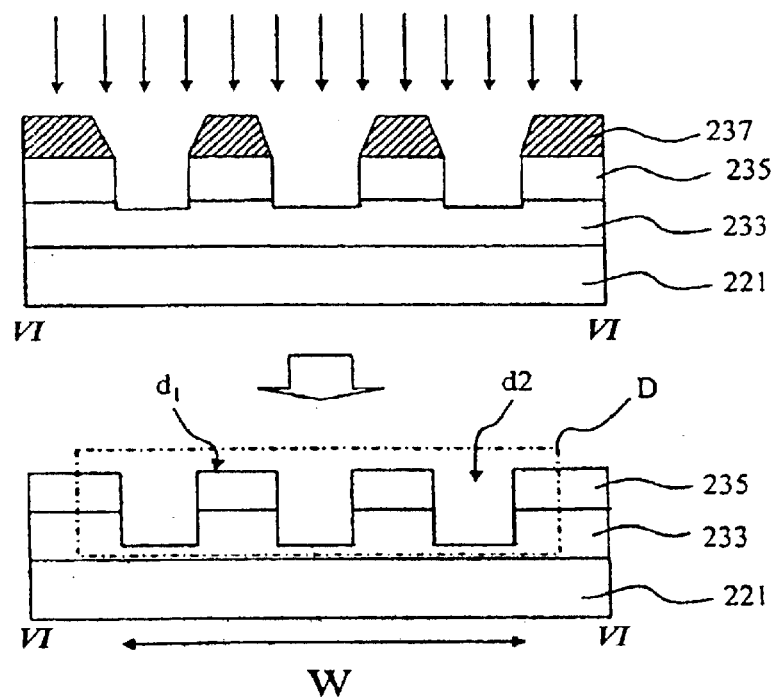
Figure 7C:
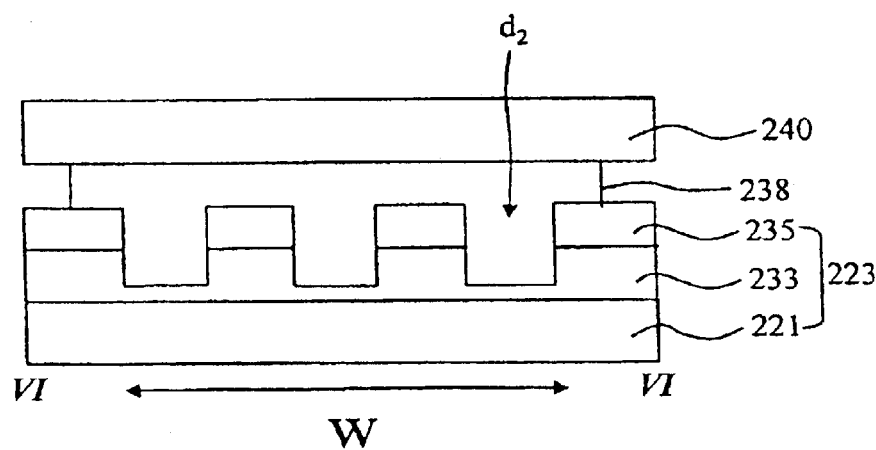

FIGS. 7A to 7C are cross-sectional views taken along the line VI—VI of FIG. 4 illustrating fabricating processes for a seal pattern according to a second embodiment of the present invention.

FIG. 7A illustrates a photoresist process for patterning a passivation layer and a gate insulation layer in the seal pattern area of the array substrate. As shown in the drawing, the gate insulation layer 233 and the passivation layer 235 are stacked on a substrate 221. Here, the gate insulation layer 233 is an inorganic material and the passivation layer 235 is an organic material. A photoresist layer 237 is formed on the passivation layer 235.

After performing a light exposure process using a mask (not shown), some portions of the photoresist layer 237 are stripped off in order to form projecting portions "$f_1$" and indented portions "$f_2$". The indented portions "$f_2$" expose the surface of the passivation layer 235. The patterned portion of the photoresist layer 237 is as wide as the width "W" of the seal pattern area where the sealant is formed in the later step. Also, when patterning the photoresist layer 237, the width "b" of each indented portion "$f_2$" is nearly equal to the width "a" of each projecting portion "$f_1$". This is due to a closely formed uneven-shaped surface in the seal pattern area of the array substrate 223.

FIG. 7B illustrates a process of etching the organic material (i.e., the passivation layer 235) below the indented portions "$f_2$" of FIG. 7A. The passivation layer 235 is etched out using a dry-etching method. In this process, some portions of the gate insulation layer 233, below the indented portions "$f_2$", are also etched.

Next, while the residual photoresist layer 237 on the passivation layer 235 is completely removed, other portions of the gate insulation layer 233 below the indented portions "$f_2$" of FIG. 7A are etched to form external projections "$d_1$" and internal indentations "$d_2$". Finally, an uneven-shaped seal pattern area "D", which is limited within the width "W" of the seal pattern area, is complete. Moreover, this etching process is simultaneously performed with forming a drain contact hole to the drain electrode.

Now, referring to FIG. 7C, a sealant 238 (i.e., a seal pattern) is formed into the internal indentations "$d_2$" and in the seal pattern area that has the width "W", using the screen-print method described before. During performing the screen-printing process, the sealant 238 fulfills the internal indentations "$d_2$" and contacts the inorganic material (i.e., the gate insulation layer 233). After that, the upper substrate 240 is aligned and attached to the array substrate 223.

However, the internal indentations "$d_2$" is not formed in all seal pattern areas that are disposed transversely and longitudinally as shown in FIG. 4. The internal indentations "$d_2$" are sparsely formed in the determined portions of the seal pattern area except for the portions for a plurality of gate and data lines.

As described above, due to the uneven-shaped seal pattern area "D" depicted in FIG. 7B, the portions of the organic material (i.e., the passivation layer 235), which corresponds to the internal indentations "$d_2$", are removed in the seal pattern area. Thus, the sealant formed in the seal pattern area contacts not only the organic material but also the inorganic material (i.e., the gate insulation layer 233). Moreover, owing to the uneven-shaped seal pattern area "D", the contacting area between the sealant and the array substrate is enlarged. As a result, the adhesive force is increased between the sealant and the array substrate.

In general, the array substrate includes a switching element, a gate, and data lines, which are formed thereon. The sequential configuration order for forming the gate and data lines depends on the TFT type, as described before. In a third embodiment, an inverted staggered type TFT is elected as an example. Thus, detailed explanation will be focused on the inverted staggered type TFT.

Figure 5:
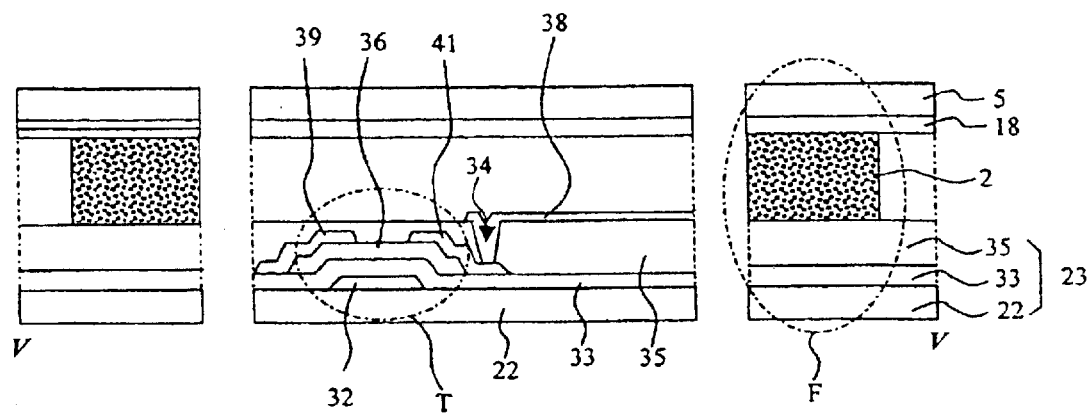
FIG. 5A is a cross-sectional view taken along line V—V of FIG. 4.

According to the inverted staggered type TFT, as shown in FIG. 5A, the gate lines are initially formed on the substrate. The insulation layer is then formed on the substrate to cover the gate lines. Thereafter, the data lines are formed on the insulation layer. Thus, the data lines are insulated from the gate lines by the insulation layer. Moreover, the passivation layer is formed to cover the data lines.

FIGS. 8A to 8C and 9A to 9C are cross-sectional views taken along the line VI—VI of FIG. 4 illustrating fabricating processes for a seal pattern according to a third embodiment of the present invention.

Figure 8A:
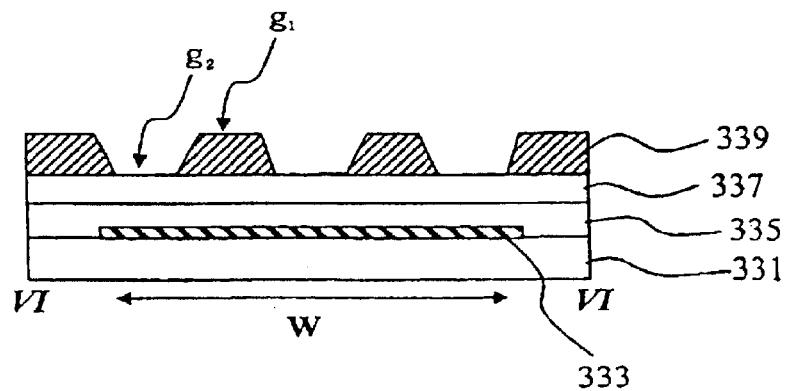
FIGS. 8A to 8C and 9A to 9C are cross sectional views taken along the line VI—VI of FIG. 4 illustrating fabricating processes for a seal pattern according to a third embodiment of the present invention.
Figure 9A:
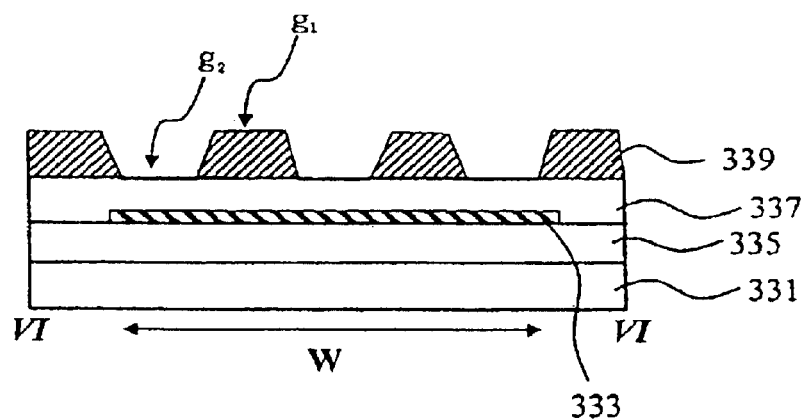
Figure 9B:
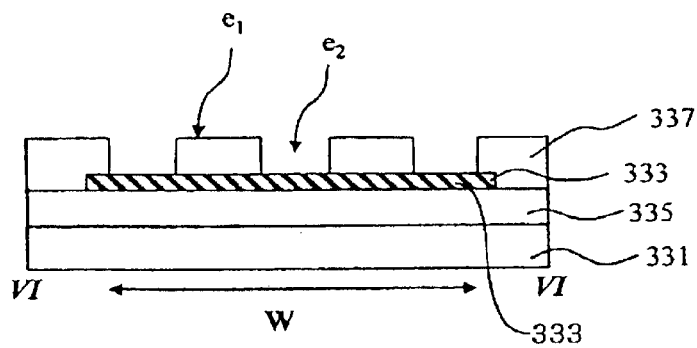

As shown in FIGS. 8A and 9A, when forming either the gate lines or the data lines, an island-shape metal layer 333 is formed in the seal pattern area for improving adhesion to the seal pattern. Thus, the gate insulation layer 335 or the passivation layer 337 is formed on the island-shape metal layer 333.

Referring to FIG. 8A, when the island-shape metal layer 333 is formed with the gate lines (not show) on the substrate 331, an inorganic gate insulation layer 335 and an organic passivation layer 337 are stacked in series over the island-shape metal layer 333. On the other hand, referring to FIG. 9A, when the island-shape metal layer 333 is formed on the inorganic gate insulation layer 335 with the data lines (not shown), the organic passivation layer 337 is only formed on the island-shape metal layer 333.

FIG. 8A also illustrates a photoresist process for patterning both the gate insulation layer 335 and the passivation layer 337 in the seal pattern area of the array substrate. FIG. 9A illustrates a photoresist process for patterning only the passivation layer 337.

As shown in FIG. 8A, the gate insulation layer 335 and the passivation layer 337 are formed in series on a substrate 331 and over the island-shape metal layer 333. In FIG. 9A, the gate insulation layer 335 is formed on the substrate 331, the island-shape metal layer 333 is formed on the gate insulation layer 335. Then, the passivation layer 337 is formed on the gate insulation layer 335 to cover the island-shape metal layer 333. Here, the gate insulation layer 335 is an inorganic material and the passivation layer 337 is an organic material. A photoresist layer 339 is then formed on the passivation layer 337.

After performing a light exposure process using a mask (not shown), some portions of the photoresist layer 339 are stripped off in order to form projecting portions "$g_1$" and indented portions "$g_2$". Thus, the indented portions "$g_2$" expose the surface of the passivation layer 337. The patterned portion of the photoresist layer 339 is as wide as the width "W" of the seal pattern area where the sealant is formed in the later step.

Figure 8B:
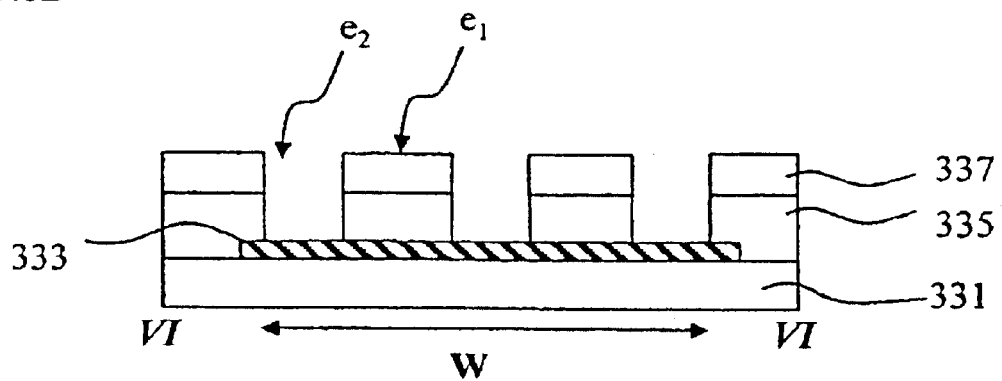

FIG. 8B illustrates a process of etching the organic material (i.e., the passivation layer 337) and the inorganic material (i.e., the gate insulation layer 335) below the indented portions "$g_2$" of FIG. 8A. FIG. 9A illustrates a process of etching only the organic material (i.e., the passivation layer 337). A dry-etching method is adopted in these etching processes.

In FIG. 8A, the passivation layer 337 and the gate insulation layer 335 are patterned altogether to form external projections "$e_1$" and internal indentations "$e_2$" (shown in FIG. 8B). Some portions of the island-shape metal layer 333 are exposed by the internal indentations "$e_2$". However, referring to FIG. 9A, only the passivation layer 337 is patterned to form the external projections "$e_1$" and the internal indentations "$e_2$".

Finally, an uneven-shaped surface of the array substrate is complete within the width "W" of the seal pattern area. Moreover, this etching process is simultaneously performed with forming the drain contact hole to the drain electrode. In the third embodiment, the gate insulation layer may be formed of an organic material.

Figure 8C:
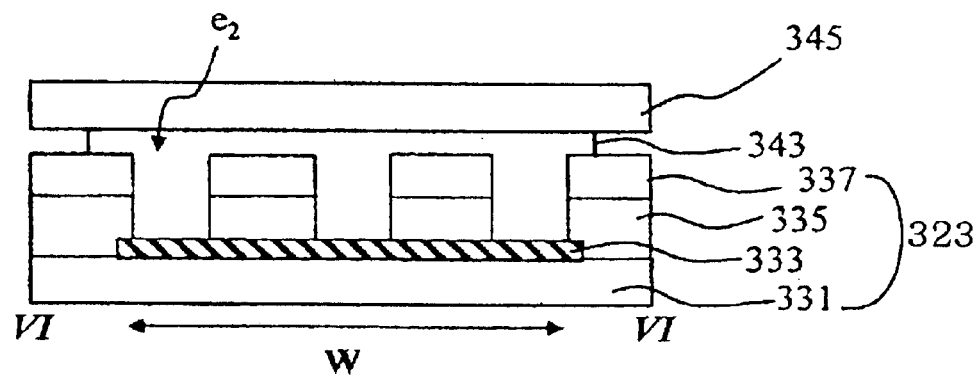
Figure 9C:
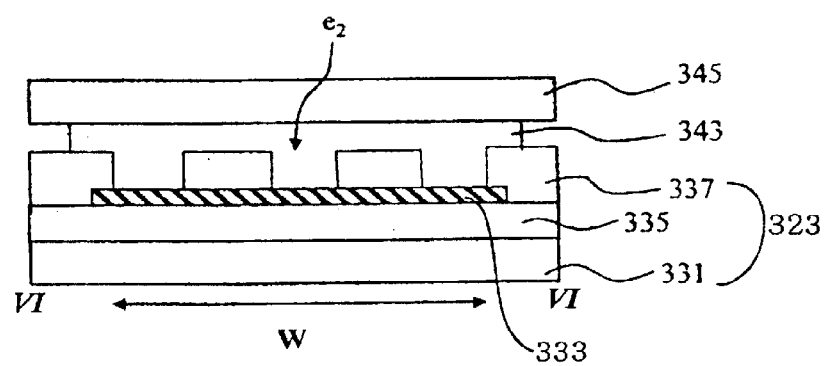

Now, referring to FIGS. 8C and 9C, a sealant 343 (i.e., a seal pattern) is formed into the internal indentations "$e_2$" and in the seal pattern area that has the width "W", using the screen-print method described before. During the screen-printing process, the sealant 343 fulfills the internal indentations "$e_2$" and contacts the island-shape metal layer 333. After that, the upper substrate 345 is aligned and attached to the array substrate 323. The adhesion of the island-shape metal layer 333 to the sealant 343 is greater than that of the organic material (the passivation layer 337) to the sealant 343. In other words, the island-shape metal layer 333 has a greater adhesion to the sealant 343 than the organic material does. Therefore, in these structures, not only the contacting area but also the adhesion increases between the sealant 343 and the array substrate 323.

Figure 10A:
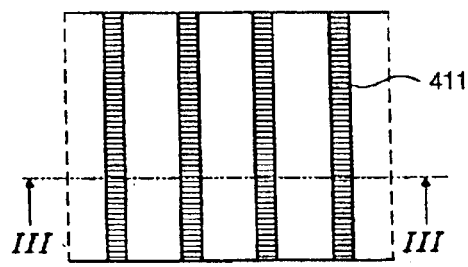
FIGS. 10A to 10D are plan views of a seal pattern area illustrating the shape of a seal pattern according to the present invention.
Figure 10B:
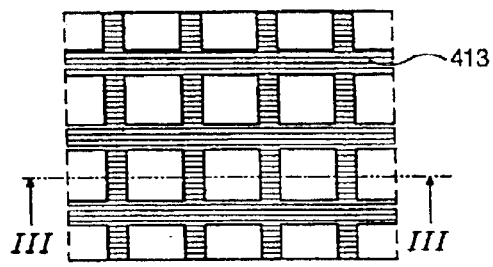
Figure 10C:
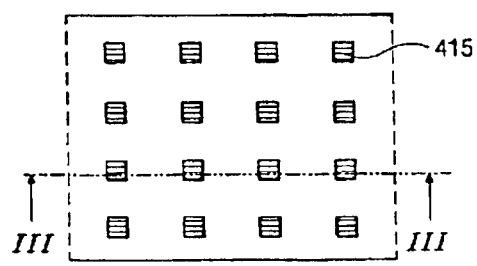
Figure 10D:
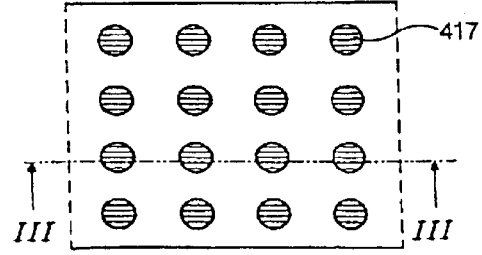

FIGS. 10A to 10D are plan views of seal pattern areas illustrating shapes of a seal pattern according to the present invention. The etching holes (reference numeral 141 of FIG. 6C) or the internal indentations (reference numeral "$e_2$" of FIGS. 8C and 9C) may be formed into longitudinal lines 411 in the seal pattern area, as shown in FIG. 10A. The shape of the etching holes or the internal indentations may be a lattice 413, as shown in FIG. 10B. Moreover, the etching holes or the internal indentations may be shaped like quadrilaterals 415, as shown in FIG. 10C. They may also be shaped like circles 417, as shown in FIG. 10D. When each seal pattern area is cut along the line III—III of FIGS. 10A to 10D, a cross-sectional view will be one of FIGS. 6C, 7C, 8C and 9C that have etching holes or internal indentations.

As described above, according to the present invention, since the uneven-shaped surface is formed in the seal pattern area of the array substrate, the contacting area between the sealant and the array substrate is enlarged. Therefore, adhesion between the sealant and the array substrate is improved. As a result, a burst of the sealant is prevented, and the manufacturing yield is increased.

It will be apparent to those skilled in the art that various modifications and variations can be made in the capacitor and the manufacturing method thereof of the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
    a plurality of gate lines extended from each gate on a substrate;
    a gate insulating layer on the substrate including the gate lines;
    a plurality of data lines arranged to be perpendicular to the gate lines;
    a passivation layer over the data lines and the gate insulation layer;
    a plurality of etching holes in the passivation layer and the gate insulating layer, wherein the gate insulating layer within the etching holes has at least one concave and convex portions; and
    a plurality of seal pattern lines in the etching holes.

2. The liquid crystal display according to claim 1, wherein the gate insulation layer includes an inorganic material.

3. The liquid crystal display according to claim 2, wherein the inorganic material is selected from the group consisting of at least one of silicon oxide and silicon nitride.

4. The liquid crystal display according to claim 1, wherein the etching hole has one of a circular, quadrilateral, straight line, and lattice shapes.

5. The liquid crystal display according to claim 1, wherein the passivation layer includes an organic material.

6. The liquid crystal display according to claim 5, wherein the organic material is selected from the group consisting of at least one of benzocyclobutene and acryl.

7. The liquid crystal display according to claim 1, wherein the passivation layer within the etching holes substantially matches the convex portion of the gate insulating layer.

8. A liquid crystal display device, comprising:
    a plurality of gate lines extended from each gate on a substrate;
    a gate insulating layer on the substrate including the gate lines;
    a plurality of data lines arranged to be perpendicular to the gate lines;
    a passivation layer over the data lines and the gate insulation layer;
    a plurality of etching holes in the passivation layer and the gate insulating layer, wherein the gate insulating layer within the etching holes has at least one concave and convex portions and the passivation layer within the etching holes substantially matches the convex portion of the gate insulating layer;
    a plurality of seal pattern lines in the etching holes; and
    an adhesion enhancing metal line between the substrate and the seal pattern lines.

9. The liquid crystal display according to claim 8, wherein the adhesion enhancing metal line directly contacts the substrate and the seal pattern lines.

10. The liquid crystal display according to claim 8, wherein the adhesion enhancing metal line directly contacts the gate insulating layer and the seal pattern lines.

11. A method of fabricating a liquid crystal display device, the method comprising:
    forming a plurality of gate lines extended from each gate on a substrate;
    forming a gate insulating layer on the substrate including the gate lines;
    forming a plurality of data lines arranged to be perpendicular to the gate lines;
    forming a passivation layer over the data lines and the gate insulation layer;
    forming a plurality of etching holes in the passivation layer and the gate insulating layer, wherein the gate insulating layer within the etching holes has at least one concave and convex portions; and
    forming a plurality of seal pattern lines in the etching holes.

12. The method according to claim 11, wherein the step of forming a plurality of etching holes in the passivation layer and the gate insulating layer includes:
    forming a photoresist layer on the passivation layer;
    exposing a portion of the photoresist layer using a mask having slits;
    stripping the exposed portion of the photoresist layer using a stripping solution, thereby forming an at least one concave and convex portions on the surface of the photoresist layer; and
    removing a portion of the passivation layer and the gate insulating layer to form a plurality of etching holes.

13. The method according to claim 11, wherein the step of forming a plurality of etching holes in the passivation layer and the gate insulating layer includes the steps of:
    forming a photoresist layer on the passivation layer;
    patterning the photoresist layer to have patterns; and
    removing a portion of the passivation layer and the gate insulating layer to form a plurality of etching holes, wherein the etching holes substantially match the patterns of the photoresist layer.

14. A method of fabricating a liquid crystal display device, the method comprising:
    forming a plurality of gate lines extended from each gate on a substrate;
    forming a gate insulating layer on the substrate including the gate lines;
    forming a plurality of data lines arranged to be perpendicular to the gate lines;
    forming a passivation layer over the data lines and the gate insulation layer;
    forming a plurality of etching holes in the passivation layer and the gate insulating layer, wherein the gate insulating layer within the etching holes has at least one concave and convex portions and the passivation layer within the etching holes substantially matches the convex portion of the gate insulating layer;
    forming a plurality of seal pattern lines in the etching holes; and forming an adhesion enhancing metal line between the substrate and the seal pattern lines.

15. The method according to claim 14, wherein the adhesion enhancing metal line directly contacts the substrate and the seal pattern lines.

16. The method according to claim 14, wherein the adhesion enhancing metal line directly contacts the gate insulating layer and the seal pattern lines.

17. An array substrate for a liquid crystal display device, comprising:
- a plurality of gate lines arranged in a transverse direction on a substrate;
- a plurality of data lines arranged in a longitudinal direction perpendicular to each gate line;
- a plurality of switching elements, each switching element includes,
  - a gate electrode extended from the gate line;
  - a source electrode extended from the data line;
  - a drain electrode space apart from the source electrode;
  - a gate insulation layer on the gate electrode; and
  - an active layer interposed between the gate insulation layer and the source and drain electrodes;
- a passivation layer over the switching elements and on the gate insulation layer, the passivation layer having a drain contact hole to the drain electrode;
- a pixel electrode corresponding to each switching element, the pixel electrode contacting the drain electrode through the drain contact hole; and
- a plurality of seal pattern lines that are arranged along edges of the passivation layer;
- wherein each seal pattern line is disposed in a seal pattern area that has a width over the substrate;
- wherein the seal pattern area is defined along the edges of the passivation layer; and
- wherein the seal pattern area has a plurality of internal indentations and external projection.

18. The array substrate according to claim 17, wherein the internal indentations are formed between the data lines in the seal pattern area.

19. The array substrate according to claim 17, wherein each internal indentation has at least one of circular, quadrilateral, lattice, and longitudinal lines.

20. The array substrate according to claim 17, further comprising an adhesion enhancing metal layer below the seal pattern area.

21. The array substrate according to claim 20, wherein some portions of the adhesion enhancing metal layer are exposed by a plurality of the internal indentations.

22. The array substrate according to claim 20, wherein the adhesion enhancing metal layer and the plurality of the gate lines are formed at the same time.

23. The array substrate according to claim 20, wherein the adhesion enhancing metal layer and the plurality of the data lines are formed at the same time.

24. A method of forming a seal pattern for a liquid crystal display device, the method comprising:
- forming a plurality of gate lines in a transverse direction on a substrate;
- forming a plurality of gate electrodes, each gate electrodes extended from each gate line;
- forming a gate insulation layer on the substrate to cover the gate lines and the gate electrodes;
- forming an active layer on the gate insulation layer and over each gate electrode;
- forming a plurality of data lines on the gate insulation layer, each data lines is perpendicular to the gate lines;
- forming source and drain electrodes on the active layer and over each gate electrode, source and drain electrodes spaced apart from each other;
- forming a passivation layer on the gate insulation layer to cover the data lines and the source and drain electrodes;
- defining a seal pattern area on a surface of the passivation layer and along edges of the passivation layer, the seal pattern area having a width; and
- etching portions of the passivation and gate insulation layers which correspond to the seal pattern area to form a plurality of internal indentation and external projection.

25. The method of forming the seal pattern according to claim 24, further comprising the step of forming an adhesion enhancing metal layer on the substrate and below the seal pattern area at the same time as the step of forming a plurality of the gate lines.

26. The method of forming the seal pattern according to claim 24, further comprising the step of forming an adhesion enhancing metal layer on the gate insulation layer and below the seal pattern area at the same time as the step of forming a plurality of the data lines.

27. The method of forming the seal pattern according to claim 24, wherein each internal indentation has at least one of circular, quadrilateral, lattice, and longitudinal line shape.

28. The array substrate according to claim 17, wherein the internal indentations are formed between the gate lines in the seal pattern area.

* * * * *